US011951739B2

United States Patent

Martin et al.

(10) Patent No.: US 11,951,739 B2
(45) Date of Patent: Apr. 9, 2024

(54) FLUIDIC DIE WITH HIGH ASPECT RATIO POWER BOND PADS

(71) Applicant: Hewlett-Packard Development Company, L.P., Spring, TX (US)

(72) Inventors: Eric Thomas Martin, Corvallis, OR (US); Gary G. Lutnesky, Corvallis, OR (US); James R. Przybyla, Corvallis, OR (US); Rogelio Cicili, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 88 days.

(21) Appl. No.: 17/799,708

(22) PCT Filed: Mar. 9, 2020

(86) PCT No.: PCT/US2020/021689
§ 371 (c)(1),
(2) Date: Aug. 15, 2022

(87) PCT Pub. No.: WO2021/183100
PCT Pub. Date: Sep. 16, 2021

(65) Prior Publication Data

US 2023/0071745 A1 Mar. 9, 2023

(51) Int. Cl.
*B41J 2/14* (2006.01)
*B41J 2/045* (2006.01)

(52) U.S. Cl.
CPC ....... *B41J 2/14072* (2013.01); *B41J 2/04543* (2013.01); *B41J 2/0458* (2013.01); *B41J 2/04581* (2013.01); *B41J 2002/14491* (2013.01); *B41J 2202/11* (2013.01); *B41J 2202/20* (2013.01)

(58) Field of Classification Search
CPC ................ B41J 2/14072; B41J 2/04543; B41J 2/04581; B41J 2002/14491; B41J 2202/11; B41J 2202/20
See application file for complete search history.

(56) References Cited

U.S. PATENT DOCUMENTS

| | | | | |
|---|---|---|---|---|
| 5,686,317 A * | 11/1997 | Akram | H05K 3/4007 29/842 |
| 6,435,668 B1 | 8/2002 | Barbour et al. | |
| 7,030,490 B2 | 4/2006 | Lee | |
| 7,216,956 B2 | 5/2007 | Silverbrook | |
| 8,101,438 B2 | 1/2012 | McAvoy et al. | |
| 8,853,001 B2 | 10/2014 | Pendse | |
| 10,112,399 B2 | 10/2018 | Kudo et al. | |

FOREIGN PATENT DOCUMENTS

| | | |
|---|---|---|
| WO | 2019/013772 A1 | 1/2019 |
| WO | 2019/013792 A1 | 1/2019 |
| WO | 2019/017867 A1 | 1/2019 |

* cited by examiner

*Primary Examiner* — Sharon Polk
(74) *Attorney, Agent, or Firm* — Foley & Lardner LLP

(57) ABSTRACT

In one example in accordance with the present disclosure, a fluidic die is described. The fluidic die includes a substrate and fluid actuators, the fluid actuators being disposed on the substrate. The fluidic die also includes a bond pad region defined on the substrate. The bond pad region includes a high aspect ratio power delivery bond pad with multiple bonding sites and a high aspect ratio power return bond pad with multiple bonding sites.

15 Claims, 5 Drawing Sheets

FLUIDIC DIE WITH HIGH ASPECT RATIO POWER BOND PADS

BACKGROUND

A fluidic die is a component of a fluidic system. The fluidic die includes components that manipulate fluid flowing through the system. For example, a fluidic ejection die, which is an example of a fluidic die, includes a number of nozzles that eject fluid onto a surface. The same or a different fluidic die may also include non-ejecting fluid actuators such as micro-recirculation pumps that move fluid through the fluidic die. Using these nozzles and pumps, fluid, such as ink and fusing agent among others, is ejected or moved.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
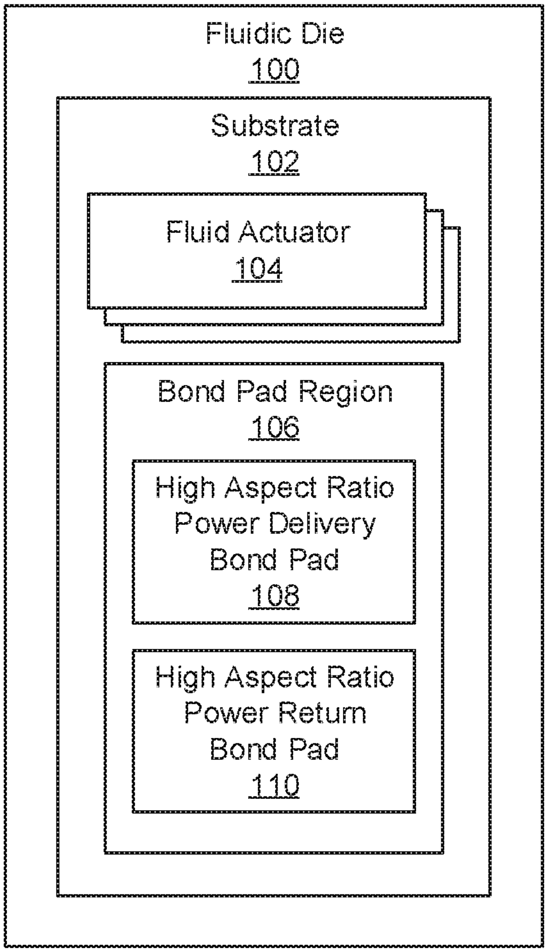
FIG. 1 is a block diagram of a fluidic die with high aspect ratio power bond pads, according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Fluidic die, as used herein, may describe a variety of types of integrated devices with which small volumes of fluid may be pumped, mixed, analyzed, ejected, etc. Such fluidic dies may include ejection dies, such as those found in printers, additive manufacturing distributor components, digital titration components, and/or other such devices with which volumes of fluid may be selectively and controllably ejected.

In general, print devices dispense fluid such as ink onto a surface in the form of images, text, or other patterns. The fluid may be held in a reservoir. The fluid in the reservoir is passed to a fluidic die that contains components that move or eject fluid. In a specific example, ejecting fluid actuators may be coupled to nozzles. Through these nozzles, fluid, such as ink and fusing agent among others, is ejected.

These fluidic die are found in any number of print devices such as inkjet printers, multi-function printers (MFPs), page-wide printers, and additive manufacturing apparatuses. The fluidic die in these devices are used for precisely, and rapidly, dispensing and/or displacing small quantities of fluid. For example, in an additive manufacturing apparatus, the fluidic die dispenses fusing agent. The fusing agent is deposited on a build material, which fusing agent facilitates the hardening of build material to form a three-dimensional product.

In another example, fluidic die dispense ink on a two-dimensional print medium such as paper. For example, during inkjet printing, fluid is directed to a fluidic die. Depending on the content to be printed, the device in which the fluidic die is disposed determines the time and position at which the ink drops are to be released/ejected onto the print medium. In this way, the fluidic die releases multiple ink drops over a predefined area to produce a representation of the image content to be printed. Besides paper, other forms of print media may also be used.

Accordingly, as has been described, the systems and methods described herein may be implemented in two-dimensional printing and in three-dimensional printing. Such fluidic dies may be found in other devices such as digital titration devices and/or other such devices with which volumes of fluid may be selectively and controllably ejected.

As described above, such fluidic die may also be used in non-ejecting applications. That is, fluid actuators may also be pumps. For example, some fluidic dies include microfluidic channels. A microfluidic channel is a channel of sufficiently small size (e.g., of nanometer sized scale, micrometer sized scale, millimeter sized scale, etc.) to facilitate conveyance of small volumes of fluid (e.g., picoliter scale, nanoliter scale, microliter scale, milliliter scale, etc.). Fluidic actuators may be disposed within these channels. Upon activation, these fluid actuators may generate fluid displacement in the microfluidic channel. Such fluid pumps may be used in non-ejecting applications or may be included on a printing device in an area where fluid is moved, but not ejected.

Each fluidic die includes a fluid actuator to eject/move fluid. In a fluidic ejection die, a fluid actuator may be disposed in an ejection chamber, which chamber has an opening. The fluid actuator in this case may be referred to as an ejector that, upon actuation, causes ejection of a fluid drop via the opening.

Examples of fluid actuators include a piezoelectric membrane-based actuator, a thermal resistor-based actuator, an electrostatic membrane actuator, a mechanical/impact driven membrane actuator, a magneto-strictive drive actuator, or other such elements that may cause displacement of fluid responsive to electrical actuation. A fluidic die may include a plurality of fluid actuators, which may be referred to as an array of fluid actuators.

While such fluidic die have undoubtedly advanced the field of precise fluid delivery, some conditions impact their effectiveness. For example, each fluidic die includes bond pads that form an electrical path between the fluidic die and the device to which it is coupled. Electrical signals passed along these electrical paths activate fluid actuators and other components. Data may also be transmitted along these paths. However, given the size of the fluidic die and the array of fluid actuators disposed on the fluidic die, there may be reduced space available for such bond pad connections. In some cases, to reduce the amount of substrate surface dedicated to bond pads, the bond pads are formed per certain manufacturing constraints such as a pad-to-pad spacing and constraints regarding wire bond processes.

However, the process of forming the bonds between bond pads and electrical traces may be complicated, and in some examples may be unsuccessful. For example, an electrical trace may be coupled to the fluidic die via ball bonding at the bond pad site. In ball bonding, an electrical wire is attached to the bond pad through a combination of pressure, ultrasonic energy, and in some cases heat. The other end of the wire may be bonded to a corresponding bond pad on an interposer circuit board. As noted above, this ball-bonding process may be complex. That is, a ball-bonding of an electrical trace to a bond pad may be ineffective at transmitting data and/or power. If a bond fails at one of the aforementioned small bond pads, it may be the case that the entire fluidic die is to be scrapped.

Accordingly, the present specification describes bond pads that allow for failed wire bonds to be re-worked, as opposed to scrapping a part based on a failed wire bond. Specifically, a bond pad that allows for re-work may have extra conductive material added to it to allow for a second bond site. If testing indicates that an electrical path is not established at a first bond site, a second bond can be made at a different site, but still on that same bond pad. However, as noted above, due to the geometric characteristics of certain fluidic die substrates, additional developments to bond pad configuration may enhance the operation of the fluidic die.

For example, fluid actuators operate to eject/move fluid. Specifically, an ejector ejects fluid from an ejection chamber through a nozzle. This energy is delivered to the fluidic die via bond pads. To eject fluid, a voltage of between 30 volts (V) and 35 V may be passed to the respective fluid actuators. Accordingly, high voltage power and return bond pads are disposed on the fluidic die to supply power to fluid actuator circuits to fire. On any given fluidic die there may be multiple redundant high voltage delivery and return bond pads to deliver power in parallel to the various fluidic actuators and to reduce parasitic resistances.

That is, the parasitic resistances associated with the power network on the fluidic die can result in non-uniform power levels being delivered to the array of fluid actuators on the fluidic die, which may result in non-uniformity of drop characteristics. More specifically, as the high voltage signals are transmitted from the bond pads to the respective fluid actuators, the strength of that signal is modified due to the physical limitations of signal propagation. Accordingly, fluid actuators closer to the bond pads may receive higher voltages as compared to fluid actuators that are farther away from the bond pads. That is, the further current flows along the power delivery path before it connects with the fluid actuators, the more degraded power will be for that fluid actuators. Differences in received voltages can affect actuator operation, which can affect drop characteristics. Accordingly, differences in voltages which result from different parasitic resistance can lead to disparity in ejected drop characteristics, which results in decreased print quality.

Accordingly, the present specification describes fluidic die that address these and other issues. Specifically, the present specification describes a fluidic die that increases power uniformity across fluid actuators, reduces the amount of substrate used for bond pads, and provides bond pads that include re-work sites so that duplicate wire bonds can be done. This allows for a certain percentage of wire bonds to fail without compromising the operation of the fluidic die. This may be accomplished via a single ultra-wide side connect power bond pad and return bond pad which each accommodate many wire bonds.

In some examples, such as an S-shaped print module, placement of an interposer circuit board may dictate where on the fluidic die the bond pads may be placed. In this example, most or all bond pads are on a single fluidic die edge, comprising a "side connect" interconnect topology. As described above, it may be desirable to deliver power to fluid actuators on the fluidic die such that parasitic resistance on the high voltage power and high voltage return nodes are uniform across fluid actuators. Accordingly, the bond pads of the present fluidic die have a high aspect ratio and are placed so as to enhance 1) power uniformity to fluid actuators, 2) bond pad area efficiency, and 3) bond re-work.

Specifically, the present specification describes a fluidic die. The fluidic die includes a substrate and fluid actuators disposed on the substrate. The fluidic die also includes a bond pad region defined on the substrate. The bond pad region includes a high aspect ratio power delivery bond pad with multiple bonding sites and a high aspect ratio power return bond pad with multiple bonding sites.

The present specification also describes a print module. The print module includes a die carrier and a number of rows of fluidic die disposed on the die carrier. Each fluidic die includes a substrate and fluid actuators disposed on the substrate to displace a fluid. Each fluidic die also includes a bond pad region defined along a long edge of the substrate. The bond pad region includes a high aspect ratio power delivery bond pad with multiple bonding sites and a high aspect ratio power return bond pad with multiple bonding sites.

The present specification also describes another example of a print module. In this example, the print module includes an S-shaped die carrier, a first circuit board disposed on the S-shaped die carrier. The first circuit board receives signals from a print device. The print module also includes an interposer circuit board disposed on top of a portion of the first circuit board. The interposer circuit board routes signals from the first circuit board to fluidic die of the print module. The print module also includes a number of staggered rows of fluidic die disposed on the S-shaped die carrier. In this example, the fluidic die are disposed around edges of the interposer circuit board such that a bond pad region of each fluidic die is adjacent and connected to the interposer circuit board and fluidic die in a second row are identical to, and rotated 180 degrees relative to, fluidic die in a first row. Each fluidic die includes fluid actuators disposed on a substrate to displace a fluid and a bond pad region defined on the substrate. The bond pad region includes a high aspect ratio power delivery bond pad with multiple bonding sites and a high aspect ratio power return bond pad with multiple bonding sites.

In summary, such a fluidic die 1) provides a higher bond wire density by saving space between bond pads; 2) allows for bond re-work without scrapping a fluidic die; and 3) allows enhanced power uniformity; 4) allows for overmolded headland for enhanced mechanical robustness and serviceability; and 5) provides fluidic overlap regions, both on a single print module and between adjacent print modules.

As used in the present specification and in the appended claims, the term "height" refers to a bond pad dimension that is orthogonal to the nearest edge of the fluidic die substrate.

Accordingly, as used in the present specification and in the appended claims, the term "width" refers to a bond pad dimension that is parallel to the nearest edge of the fluidic die substrate and is orthogonal to the height dimension of the bond pad.

As used in the present specification and in the appended claims, the term "high aspect ratio" refers to a bond pad that has at least a 3-to-1 width-to-height ratio. That is, the width of a bond pad, as measured along a direction parallel to a nearest edge of the fluidic die, may be at least 3 times greater than a height of the bond pad as measured along a direction perpendicular to a nearest edge of the fluidic die. In other examples, the bond pad may have a 5-to-1, 10-to-1, 12-to-1 or greater aspect ratio.

Figure 2:
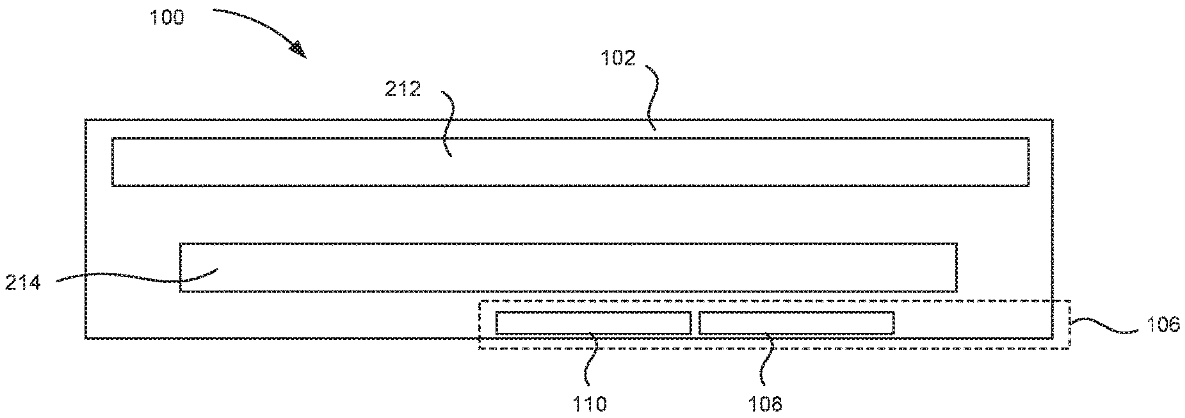
FIG. 2 is a top view of a fluidic die with high aspect ratio power bond pads, according to an example of the principles described herein.
Figure 3:
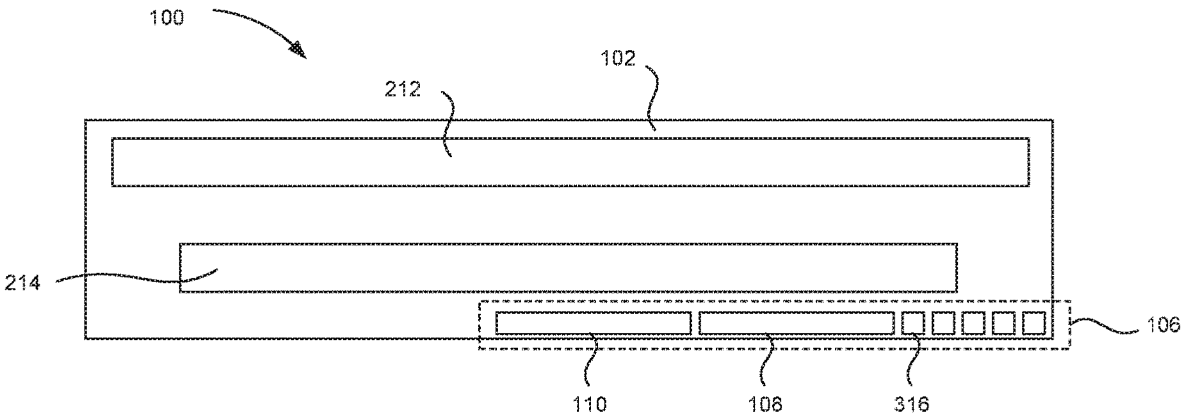
FIG. 3 is a top view of a fluidic die with high aspect ratio power bond pads, according to another example of the principles described herein.
Figure 5:
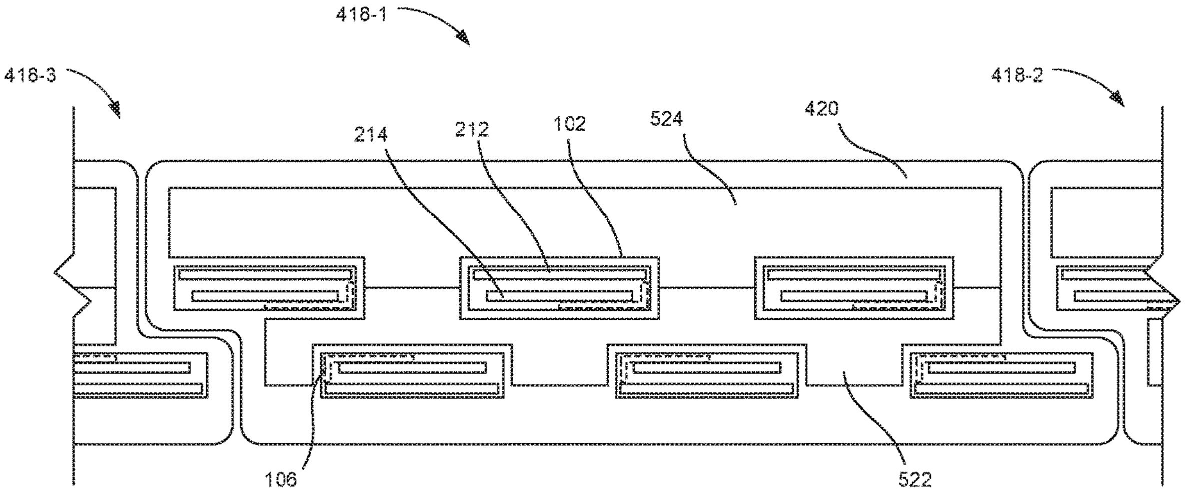
FIG. 5 is a top view of a print module with a fluidic die with high aspect ratio power bond pads, according to an example of the principles described herein.

Further, as used in the present specification and in the appended claims, the term "bond pad region," refers to an area on the substrate of the fluidic die where the bond pads are located. For example, the bond pad region may be along a single edge of the substrate as depicted in FIG. 2 or 3 or may be a corner region along two edges of the substrate as depicted in FIG. 5.

As used in the present specification and in the appended claims, the term "print device" is meant to be understood broadly as any device capable of selectively placing a fluid onto a print medium. In one example the print device is an inkjet printer such as a page-wide printer. In another example, the print device is a three-dimensional printer. In yet another example, the print device is a digital titration device.

Further, as used in the present specification and in the appended claims, the term "fluidic die" refers to a component of a fluid system that includes a number of fluid actuators. While the present specification describes fluidic die that include ejecting fluid actuators, the principles described herein may apply to fluidic die that include non-ejecting fluid actuators.

Still further, as used in the present specification and in the appended claims, the term "print medium" is meant to be understood broadly as any surface onto which a fluid ejected from a nozzle of a fluidic die may be deposited. In one example, the print medium may be paper.

Accordingly, as used in the present specification and in the appended claims, the term "fluid actuator" refers to an individual component of a fluid die that displaces fluid. A fluid actuator may be an ejecting fluid actuator, such as an ejector, or a non-ejecting actuator such as a fluid pump.

Turning now to the figures, FIG. 1 is a block diagram of a fluidic die (100) with high aspect ratio power bond pads (108, 110), according to an example of the principles described herein. As described above, a fluidic die (100) refers to a component that displaces small droplets of fluid. In use in a print device, the fluidic die (100) ejects small droplets of fluid in particular patterns onto a print medium, the ejection being controlled by a controller. The fluidic die (100) includes fluid actuators (104) that include components that effectuate the displacement of such fluid. Again, such fluid actuators (104) may be ejecting fluid actuators (104) or non-ejecting fluid actuators (104). As a specific example, a controller on a print device sends signals to the fluidic die (100) to trigger sequential ejections by ejecting fluid actuators (104) such that fluid, such as ink, is deposited on the print medium in a particular pattern.

The print medium may be any type of suitable sheet or roll material, such as paper, card stock, transparencies, polyester, plywood, foam board, fabric, canvas, and the like. In another example, the print medium may be a bed of powder material used in three-dimensional printing.

The fluidic die (100) includes a substrate (102). The substrate (102) forms a carrier that is attached to a print module such that fluid from a reservoir can be passed to, and expelled/moved by, the fluid actuators (104).

These fluid actuators (104) may rely on various mechanisms to eject/move fluid. For example, an ejector may be a firing resistor. The firing resistor heats up in response to an applied voltage. As the firing resistor heats up, a portion of the fluid in an ejection chamber vaporizes to generate a bubble. This bubble pushes fluid out an opening of the fluid chamber and onto a print medium. As the vaporized fluid bubble collapses, fluid is drawn into the ejection chamber from a passage that connects the fluid chamber to a fluid feed slot in the fluidic die (100), and the process repeats. In this example, the fluidic die (100) may be a thermal inkjet (TIJ) fluidic die (100).

In another example, the fluid actuator may be a piezoelectric device. As a voltage is applied, the piezoelectric device changes shape which generates a pressure pulse in the fluid chamber that pushes the fluid through the chamber. In this example, the fluidic die (100) may be a piezoelectric inkjet (PIJ) fluidic die (100).

As described above, such fluid actuators (104) rely on energy to actuate. Accordingly, the fluidic die (100) includes an electrical interface to receive this energy. That is, electrical signals pass through bond pads on the fluidic die (100) and are routed through the substrate (102) to the fluid actuators (104). The fluid actuators (104) then displace a small droplet of fluid. As a specific example, an ejecting fluid actuator (104) ejects a small droplet of fluid onto the surface of the print medium. Such bond pads also facilitate the transmission of different kinds of data such as evaluation and monitoring data.

Specifically, the fluidic die (100) includes a bond pad region (106) on the substrate (102). The bond pad region (106) refers to a designated space on the substrate (102) wherein different bond pads are located. A bond pad refers to an electrically-conductive material that is used to connect the fluidic die (100) to a trace through which an electrical signal is transmitted. That is, an electrical wire may be ball-bonded to the bond pad (208) to transmit data and/or power to/from the fluidic die (100).

The bond pad region (106) includes various types of bond pads. A specific example of bond pads disposed within the bond pad region (106) are actuator power bond pads. These power bond pads are of two sub-categories, power delivery bond pads and power return bond pads. Power is supplied to fluid actuators (104) via the delivery bond pads and a closed circuit is formed via the return bond pads. As described above, rather than having multiple redundant power delivery and power return bond pads, the fluidic die (100) of the present specification includes a single high aspect ratio power delivery bond pad (108) which has multiple bonding sites and a single high aspect ratio power return bond pad (100) that also has multiple bonding sites.

In some examples, the high aspect ratio power bond pads (108, 110) may have an aspect ratio of greater than 3:1. That is to say, the width of a high aspect ratio power bond pad (108, 110) may be three, or more, times greater than the height of the power bond pads (108, 110). As noted above, a width of a bond pad (108, 110) refers to its dimension that is parallel to the nearest edge of the fluidic die (100) substrate (102) and a height of the bond pad (108, 110) refers to its dimension that is perpendicular to the nearest edge of the fluidic die (100) substrate (102). FIG. 2 depicts the height and width of the bond pads (108, 110). In other examples, the high aspect ratio power bond pads (108, 110) may have different aspect ratios such as greater than 5:1, greater than 10:1, or greater than 12:1. Providing high aspect ratio power bond pads (108, 110), allows for more bond wires which allows for more efficient and uniform power delivery to an array of fluid actuators (FIG. 1, 104).

In some examples, the different power bond pads (108, 110) may have different aspect ratios. For example, the high aspect ratio power delivery bond pad (108) may have an aspect ratio of 3:1 while the high aspect ratio power return bond pad (110) may have an aspect ratio of 5:1.

For example, the fluidic die (100) may include regulating circuits on the power delivery side to maintain the voltage at a constant value on the high side. However, there may not be regulating circuits on the return side such that the voltage is not constant on the low side. This results in reduced energy delivery to the actuators as the load increases. Accordingly, larger power return bond pads (110) reduce the resistance, which is directly proportional to the amount the voltage on the low side.

In some examples, the size of the high aspect ratio power bond pads (108, 110) may be defined by the number of bond sites available on that power bond pad (108, 110). For example, the high aspect ratio power delivery bond pad (108) and the high aspect ratio power return bond pad (110) may be sized to support four or more wire bonds thereon. In other examples, the high aspect ratio power delivery bond pad (108) and the high aspect ratio power return bond pad (110) may be sized to support different numbers of bonds, such as 5, 10, 12, or 15. As will be described in an example below, all or a portion of these bond sites may initially populated. Accordingly, vacant bond sites are made available to allow for subsequent re-work of any bonds.

By providing a high aspect ratio, multi-site power bond pad (108, 110), overall space is conserved. That is, in a fluidic die (100) where there are multiple power return bond pads and multiple power delivery bond pads, the pads are spaced apart from one another. By comparison, with the high aspect ratio power bond pads (108, 110), this space between delivery bond pads can be removed, thus resulting in a higher density per linear distance of power bond sites.

FIG. 2 is a top view of a fluidic die (100) with high aspect ratio power bond pads (108, 110), according to an example of the principles described herein. FIG. 2 clearly depicts the substrate (102) on which the fluid actuators (FIG. 1, 104) are disposed. In this example, the fluid actuators (FIG. 1, 104) are formed into arrays (212, 214) with each array (212, 214) being indicated as a solid rectangle. Note that for simplicity in FIG. 2, individual fluid actuators (FIG. 1, 104) of the arrays (212, 214) are not depicted. In some examples, each array (212, 214) may pertain to a particular color. For example, a first array (212) may be fluidly connected to a reservoir of magenta ink and the second array (214) may be fluidly connected to a reservoir of cyan ink.

FIG. 2 also clearly depicts the high aspect power bond pads (108, 110) that are disposed in the bond pad region (106). In the example depicted in FIG. 2, a width of the power bond pads (108, 110) is measured along a horizontal axis of the page as that is the dimension of the bond pads (108, 110) that is parallel to a nearest edge of the fluidic die (100) substrate (102). By comparison, a height of the power bond pads (108, 110) is measured along a vertical axis of the page as that is the dimension of the bond pads (108, 110) that is perpendicular to the nearest edge of the fluidic die (100) substrate (102).

In some examples such as that depicted in FIG. 2, the bond pad region (106) may be disposed on a single edge of the substrate (102). In other examples, such as that depicted in FIG. 5, the bond pad region (106) may be a corner region that is disposed along two edges of the substrate. For simplicity in FIG. 2, a particular number of power bond pads (108, 110) having a particular shape and size are represented.

As described above, the power bond pads (108, 110) may be rectangular and have a high aspect ratio such as 3:1, 5:1, 10:1, 12:1 or 15:1 so as to facilitate multiple wire bonds on a single power bond pad (108, 110). Doing so allows power to be delivered to multiple fluid actuators (FIG. 1, 104) via the single high aspect ratio power bond pads (108, 110) rather than from multiple smaller bond pads. That is, using these high aspect ratio power bond pads (108, 110), any space used to separate bond pads is eliminated.

Moreover, in some examples, various bonding sites on the high aspect ratio power bond pads (108, 110) may be left vacant. That is, a subset of power bond pad sites in the high aspect ratio power delivery bond pad (108) and the high aspect ratio power return bond pad (108) are vacant to accommodate subsequent re-work of wire bonds. That is, if a bond is to be created at a particular power bond pad (108, 110) but for one reason or another no electrical connection is established, a new bond may be created on that same power bond pad (108, 110), albeit at a different site on the power bond pad (108, 110) without scrapping the entire fluidic die (100).

Accordingly, the power bond pads (108, 110) may be sized to accommodate more than the number of bonds anticipated. For example, if 12 bond wires are projected for a desired power delivery, the power bond pads (108, 110) may be sized to accommodate 15 bond wires so that if as many as 3 bonds fail, the print performance of the fluidic die (100) is not compromised. Such a sizing also accommodates bond wires to supply currents for the fluidic die (100) in worst-case print modes.

However, in another example each bond pad site in the high aspect ratio power delivery bond pad (108) and the high aspect ratio power return bond pad (110) may have a wire bond. This provides redundancy without having to re-work the wire bond in case one of the wire bond fails during operation. For example, if over the course of printing, a wire bond at a second site fails for some reason, an electrical signal may still be passed for example, via a tenth site. In another example, the additional wire bonds may provide for additional current to the fluidic die (100), for example as may be implemented to facilitate high voltage delivery.

As depicted in FIG. 2, in some examples the high aspect ratio power delivery bond pad (108) and the high aspect ratio power return bond pad (110) are disposed along a long edge of a rectangular substrate (102) and more particularly within the bond pad region (106) at a central location of this long edge. Put another way, the delivery and return bond pads (108, 110) are placed as close to the center of the wide edge of the fluidic die (100) substrate (102) as possible so as to make power delivery to fluid actuator (FIG. 1, 104) circuits more uniform.

Doing so may make any parasitic loss more uniform. That is, as described above parasitic resistance along the power delivery path may draw energy away from a provided actuation signal. This signal attenuation is greater the further away from the power bond pad (108, 110) a fluid actuator (FIG. 1, 104) is. Accordingly, by placing the power bond pads (108, 110) at a central location along this long edge, the difference in distances of each of the electrical traces leading towards the different fluid actuators (FIG. 1, 104) is equalized such that any parasitic loss is more uniform and can thereby be accounted for, thus increasing print quality.

Moreover, in some particular examples, the high aspect ratio power return bond pad (110) may be closer to the center of the long edge as compared to the high aspect ratio power delivery bond pad (108). This is due to the effects of regulating circuits that may operate on the delivery signal and the absence of regulating circuits with regards to the return signal. That is, given the effect of the regulating circuitry, it may be desirable to make the return lines more uniform as compared to the supply lines. Placing the return lines in a more centrally located area enables an increased uniformity.

In yet another example, the bond pad region (106) extends less than halfway across a long edge of the rectangular substrate (102). That is, as described below in connection with FIG. 5, with an S-shaped print module, a bond pad region (106) that extends beyond the halfway point may place a portion of the bond pad region (106) outside of the serviceable area of the interposer circuit board such that no connections may be made on that portion. Accordingly, by placing the bond pad region (106) such that it does not extend past a midway of this long edge, it may be ensured that all power bond pads (108, 110) are disposed adjacent and connected to the interposer circuit board, even when used with an S-shaped print module.

Note that in FIG. 2 the electrical traces from the power bond pads (108, 110) to the fluid actuator arrays (212, 214) have been omitted for simplicity. However, with fluidic die (100) that implement feed hole arrays, cross-slot routing will be possible, and the power network can be a power grid to minimize parasitics and enhance power uniformity.

FIG. 3 is a top view of a fluidic die (100) with high aspect ratio power bond pads (108, 110), according to another example of the principles described herein. As in the example depicted in FIG. 2, in the example depicted in FIG. 3 the high aspect ratio power delivery bond pad (108) and high aspect ratio power return bond pad (110) are disposed along a single edge with the high aspect ratio power return bond pad (110) being located closer to the center of the first edge.

Note that while it is mentioned that these higher voltage actuator power bond pads (108, 110) are disposed on the first edge, other bond pads may be disposed along the first edge. That is, other bond pads (316) may be placed in the bond pad region (106). As compared to the high aspect ratio power bond pads (108, 110), these other bond pads (316) may have an aspect ratio less than 3:1 and may facilitate either multiple bonding sites on a single bond pad (316) or a single bonding site on a single bond pad (316). For simplicity in FIG. 3, a single bond pad (316) is indicated with a reference number.

In this example, these other bond pads (316) may be of differing types. That is, each bond pad may be categorized by the type of connection it makes. For example, the power bond pads (108, 110) are actuator power bond pads that deliver a higher voltage as compared to non-actuator power bond pads that deliver a lower voltage to certain die components such as nozzle health evaluation components.

Certain bond pads may also be used to facilitate non-power bonds, such as data bonds where information is transmitted between the fluidic die (100) and the print device. Other examples of non-power bond pads include data bond pads that connect to data channels to convey fluid actuator (FIG. 1, 104) data, clock bond pads, data bond pads for communicating with registers on the fluidic die (100) for operating in different modes, and configuration data bond pads, among others. Accordingly, any of the afore-mentioned non-actuator power bond pads (108, 110) may be positioned within the bond pad region (106). For example, the fluidic die (100) may include components that evaluate the health of respective fluid actuators (FIG. 1, 104). Accordingly, these lower voltage bond pads, may have a reduced sensitivity to parasitic resistance, and may be disposed near an outside edge of the bond pad region (106).

Note that while FIGS. 2, 3, and 5 depict a bond pad region (106) on certain edges of the fluidic die (100), in some examples, a third edge and a fourth edge of the substrate (102) may be free of bond pads (108, 110, 316).

Figure 4:
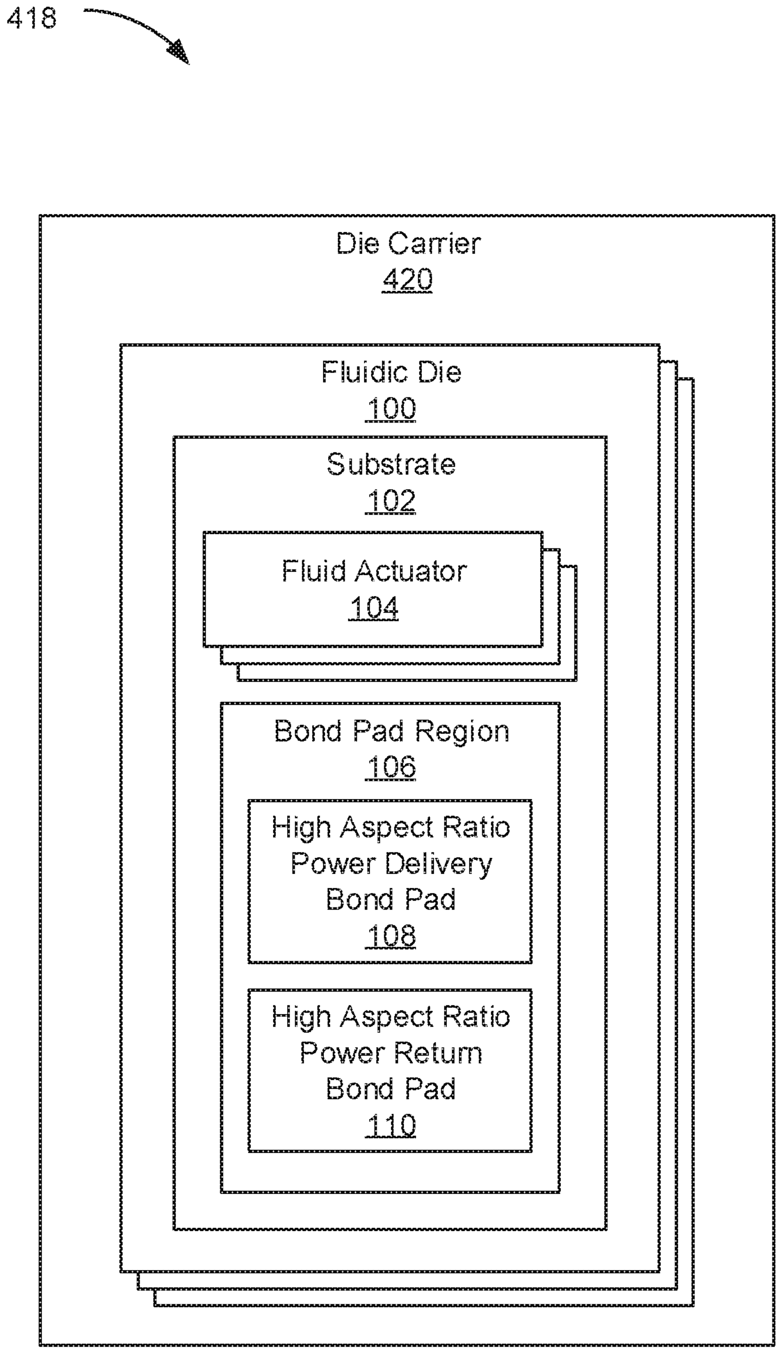
FIG. 4 is a block diagram of a print module with a fluidic die with high aspect ratio power bond pads, according to an example of the principles described herein.

FIG. 4 is a block diagram of a print module (418) with fluidic die (100) with high aspect ratio power bond pads (108, 110), according to an example of the principles described herein. As described above, the print module (418) is a component that includes multiple fluidic die (100) and that is installed in a print device. Fluid is routed through the print module (418) to the fluidic die (100) where it is ultimately ejected.

The print module (418) includes a die carrier (420) that is a substrate on which the fluidic die (100) and other components for ejecting fluid are disposed. In one particular example, the fluidic die (100) are arranged in rows on the die carrier (420). As described above, each fluidic die (100) includes a substrate (102), which may be rectangular, and fluid actuators (104) disposed on the substrate (102), which in the case of a print module (418) may be ejecting fluid actuators (104) that eject a fluid.

Each fluidic die (100) also includes a bond pad region (106) defined along a long edge of the substrate (102). This bond pad region (106) includes a high aspect ratio power delivery bond pad (108) with multiple bonding sites and a high aspect ratio power return bond pad (110) with multiple bonding sites.

FIG. 5 is a top view of a print module (418) with fluidic die (FIG. 1, 100) with high aspect ratio power bond pads (FIG. 1, 108, 110), according to an example of the principles described herein. Specifically, FIG. 5 depicts a print module (418) with fluidic die (FIG. 1, 100) where the bond pad region (106) extends across two edges of the fluidic die (FIG. 1, 100) substrate (102), which edges are adjacent and orthogonal to one another.

In some examples, the print modules (418) may be S-shaped such that they may tile in an interlocking pattern with other print modules (418-2, 418-3) such that fluid actuators (FIG. 1,104) of fluidic die (FIG. 1, 100) on one print module (418-1) overlap with fluid actuators (FIG. 1, 104) of a fluidic die (FIG. 1, 100) of another print module (418-2, 418-3). An S-shaped print module (418) may provide complete print coverage. For example, during printing, the print medium on which ink is to be deposited, may move underneath the fluidic die (FIG. 1, 100). As the print medium moves, the fluid actuators (FIG. 1, 104) are activated to eject fluid onto the print medium. Each fluidic die (FIG. 1, 100) has a "swath" which refers to a width of the fluidic die (FIG. 1, 100) and a corresponding area on the print medium onto which the fluidic die (FIG. 1, 100) can deposit fluid. Gaps between the swaths of individual fluidic die (FIG. 1, 100) result in regions where print fluid is not deposited on the target surface. Accordingly, the present specification describes a print module (418) with fluidic die (FIG. 1, 100) in staggered rows such that there is no discontinuity in fluid actuator (FIG. 1, 104) pitch across a width of the print medium.

Similarly, in some examples, a print device such as a page wide print bar may include multiple print modules (418) aligned end to end, each with multiple fluidic die (FIG. 1, 100). Gaps between fluidic die (FIG. 1, 100) on adjacent print modules (418) may lead to the same complication of areas on the print medium where fluid cannot be deposited. Accordingly, the S-shaped print modules (418) of the present specification may be tiled in an interlocking pattern such that fluidic die (FIG. 1, 100) in one print module (418) overlap with fluidic die (FIG. 1, 100) in an adjacent print module (418) such that there is no discontinuity in fluid actuator (FIG. 1, 104) pitch across the width of the print medium. Accordingly, the print module (418) includes an S-shaped die carrier (420). As media travels perpendicular to the print modules (418), for example, along a vertical direction from the top of FIG. 5 towards the bottom, there are no gaps between fluid actuators (FIG. 1, 104) on a single print module (418), nor between fluid actuators (FIG. 1, 104) on adjacent print modules (418).

To deliver energy to the fluid actuators (FIG. 1, 104) that eject the fluid, a circuit board, referred to as an interposer circuit board (522), routes signals from the first circuit board to fluidic die (FIG. 1, 100). An S-shaped print module (418) introduces certain size characteristics for the interposer circuit board (522). Specifically, the area available for bonding between the fluidic die (FIG. 1, 100) and the interposer circuit board (522) has certain characteristics as bond pads (FIG. 1, 108, 110; FIG. 3, 316) are to be located adjacent to the interposer circuit board (522). For example, in rectangular-shaped print modules, each fluidic die (FIG. 1, 100) may be surrounded on all sides by the interposer circuit board (522) and bond pads may be evenly distributed across all four sides of the fluidic die (FIG. 1, 100) or on the narrow ends of a fluidic die (FIG. 1, 100). However, as depicted in FIG. 5, due to the S-shape of the print module (418) of the present specification, not all sides of every fluidic die (FIG. 1, 100) are surrounded by this interposer circuit board (522). Put another way, the interposer circuit board (522) surrounds a subset of corners of any fluidic die (FIG. 1, 100).

Disposed on the die carrier (420) is a first circuit board (524) to receive signals from a print device. That is, the first circuit board (524) includes an electrical interface that mates with a corresponding interface on the print device in which the print module (418) is disposed.

The interposer circuit board (522) is disposed on top of a portion of the first circuit board (524) and further routes the electrical signals from the first circuit board (524) to the fluidic die (FIG. 1, 100) of the print module (418). In other words, electrical signal flow from a fluidic die (FIG. 1, 100) to the print device is 1) from the bond pads (FIG. 1, 108, 110; FIG. 3, 316) on a fluidic die (FIG. 1, 100) to the interposer circuit board (522); 2) from the interposer circuit board (522) to the first circuit board (524); 3) from the first circuit board (524) to flex connectors on the back side of the first circuit board (524), and 4) from the flex connectors to the print device. This interposer circuit board (522) is wire-bonded to the fluidic die (FIG. 1, 100), accordingly the fluidic die (FIG. 1, 100), and more particular the bond pads (FIG. 1, 108, 110; FIG. 3, 316) of the fluidic die (FIG. 1, 100), are to be adjacent this interposer circuit board (522).

Also disposed on the die carrier (420) are the fluidic die (FIG. 1, 100). In one particular example, the fluidic die (FIG. 1, 100) are arranged in staggered rows on the S-shaped die carrier (420), each staggered row having a same number of fluidic die (FIG. 1, 100). Note that as depicted in FIG. 5 and as described above, each fluidic die (FIG. 1, 100) includes a substrate (102), fluid actuators (FIG. 1, 104) arranged in arrays (212, 214) and a bond pad region (106) with high aspect ratio power delivery bond pads (FIG. 1, 108) and high aspect ratio power return bond pads (FIG. 1, 110) each having multiple bonding sites.

As described above, bond pads (FIG. 1, 108, 110; FIG. 3, 316) on the fluidic die (FIG. 1, 100) are to be adjacent to the interposer circuit board (522) to which they are wire-bonded. Given the S-shape of the print module (418), routing to ends of all fluidic die (FIG. 1, 100) may not be possible. Accordingly, to facilitate such interconnection of each fluidic die (FIG. 1, 100) to the interposer circuit board (522), the fluidic die (FIG. 1, 100) are disposed around and overlap with edges of the interposer circuit board (522) such that the bond pad region (106) of each fluidic die (FIG. 1, 100) is adjacent and connected to the interposer circuit board (522) while a second region of each fluidic die (FIG. 1, 100) is not adjacent the interposer circuit board (522). More particularly, a fluidic die (FIG. 1, 100) in each row may extend past the interposer circuit board (522) such that two sides of the one fluidic die (FIG. 1, 100) are not adjacent the interposer circuit board (522). In the example depicted in FIG. 5, the top-left fluidic die (FIG. 1, 100) and the bottom-right fluidic die (FIG. 1, 100) are these afore described fluidic die (FIG. 1, 100).

To avoid making each fluidic die (FIG. 1, 100) unique, a single fluidic die (FIG. 1, 100) configuration is replicated. That is, each fluidic die (FIG. 1, 100) is identical to one another. However, fluidic die (FIG. 1, 100) in the second row are rotated 180 degrees relative to fluidic die (FIG. 1, 100) in the first row. In so doing, the corner where the bond pad region (106) is located is different, relative to the die carrier (420), for fluidic die (FIG. 1, 100) in the first row as compared to fluidic die (FIG. 1, 100) in the second row. However, the position of the bond pad region (106) relative to other components of the fluidic die (FIG. 1, 100) may be the same for all fluidic die (FIG. 1, 100).

For example, each bond pad region (106) of fluidic die (FIG. 1, 100) in a first row is disposed at a lower-right corner of a respective fluidic die (FIG. 1, 100). However, as noted above, upon installation onto a print module (418), the orientation of the fluidic die (FIG. 1, 100) in a second row may be altered such that the bond pad region (106) of fluidic die (FIG. 1, 100) in the second row is disposed at an upper-left corner of a respective fluidic die (FIG. 1, 100). However, for each fluidic die (FIG. 1, 100) regardless of its orientation, the position of the bond pad region (106) relative to other components of the fluidic die (100) may be the same for all fluidic die (100).

Accordingly, given that each fluidic die (FIG. 1, 100) in the second row is identical to fluidic die (FIG. 1, 100) in the first row, but rotated 180 degrees, the bond pad region (106) of each is adjacent the interposer circuit board (522). Moreover, rather than making fluidic die (FIG. 1, 100) with different and unique component orientations, a single fluidic die (FIG. 1, 100) can be implemented, albeit at different orientations, on the print module (418).

Such a fluidic die (FIG. 1, 100) enhances performance in a print module (418) that incorporates an over-molded headland for enhanced mechanical robustness and serviceability and thus implements methods of interconnect to the fluidic die (FIG. 1, 100) in an appropriate fashion. Specifically, wire bonds may be used to connect the interposer circuit board (522) to the fluidic die (FIG. 1, 100) which wire bond may be embedded in epoxy mold compound.

In summary, such a fluidic die 1) provides a higher bond wire density by saving space between bond pads; 2) allows for bond re-work without scrapping a fluidic die; and 3) allows enhanced power uniformity; 4) allows for overmolded headland for enhanced mechanical robustness and serviceability; and 5) provides fluidic overlap regions, both on a single print module and between adjacent print modules.

What is claimed is:

1. A fluidic die, comprising:

a substrate;

fluid actuators disposed on the substrate; and a bond pad region defined on the substrate, the bond pad region comprising:

a high aspect ratio power delivery bond pad with multiple bonding sites; and a high aspect ratio power return bond pad with multiple bonding sites.

2. The fluidic die of claim 1, wherein the high aspect ratio power delivery bond pad and the high aspect ratio power return bond pad are disposed along a long edge of a rectangular substrate.

3. The fluidic die of claim 2, wherein the bond pad region extends less than halfway across a long edge of the rectangular substrate.

4. The fluidic die of claim 2, wherein the high aspect ratio power delivery bond pad and the high aspect ratio power return bond pad are disposed within the bond pad region at a central location of the long edge.

5. The fluidic die of claim 2, wherein the high aspect ratio power return bond pad is closer to the center of the long edge as compared to the high aspect ratio power delivery bond pad.

6. The fluidic die of claim 1, wherein the high aspect ratio power delivery bond pad and the high aspect ratio power return bond pad are sized to support four wire bonds thereon.

7. A print module, comprising:

a die carrier;

a number of rows of fluidic die disposed on the die carrier, each fluidic die comprising:

a substrate;

fluid actuators disposed on the substrate to displace a fluid; and a bond pad region defined along a long edge of the substrate, the bond pad region comprising:

a high aspect ratio power delivery bond pad with multiple bonding sites; and a high aspect ratio power return bond pad with multiple bonding sites.

8. The print module of claim 7, wherein the fluidic die are identical to one another.

9. The print module of claim 7, wherein:

the fluidic die overlap edges of an interposer circuit board, such that:

the bond pad region of each fluidic die is adjacent the interposer circuit board; and a second region of each fluidic die is not adjacent the interposer circuit board; and a fluidic die in each row extends past the interposer circuit board such that two sides of the fluidic die are not adjacent the interposer circuit board.

10. The print module of claim 7, wherein fluidic die in a second row are rotated 180 degrees relative to fluidic die in a first row.

11. A print module, comprising:

an S-shaped die carrier;

a first circuit board disposed on the S-shaped die carrier, the first circuit board to receive signals from a print device;

an interposer circuit board disposed on top of a portion of the first circuit board, the interposer circuit board to route signals from the first circuit board to fluidic die of the print module; and a number of staggered rows of fluidic die disposed on the S-shaped die carrier, wherein:

each fluidic die comprises:

a substrate;

fluid actuators disposed on the substrate to displace a fluid; and a bond pad region defined along a long edge of the substrate, the bond pad region comprising:

a high aspect ratio power delivery bond pad with multiple bonding sites; and a high aspect ratio power return bond pad with multiple bonding sites;

the fluidic die are disposed around edges of the interposer circuit board such that a bond pad region of each fluidic die is adjacent and connected to the interposer circuit board; and fluidic die in a second row are identical to, and rotated 180 degrees relative to, fluidic die in a first row.

12. The print module of claim 11, wherein a subset of bond pad sites in the high aspect ratio power delivery bond pad and the high aspect ratio power return bond pad are vacant to accommodate subsequent re-work of wire bonds.

13. The print module of claim 11, wherein each bond pad site in the high aspect ratio power delivery bond pad and the high aspect ratio power return bond pad have a wire bond.

14. The print module of claim 11, wherein the print module is tiled in an interlocking pattern with other print modules such that nozzles of fluidic die on one print module overlap with nozzles of fluidic die on a fluidic die of another print module.

15. The print module of claim 11, wherein each staggered row comprises a same number of fluidic die.

* * * * *